US 9,165,426 B2

(12) United States Patent
Jones et al.

(10) Patent No.: US 9,165,426 B2
(45) Date of Patent: Oct. 20, 2015

(54) SYSTEM AND METHOD FOR ATTENDING A RECORDED EVENT IN A METAVERSE APPLICATION

(75) Inventors: Angela Richards Jones, Durham, NC (US); FuYi Li, Sudbury, MA (US); Ruthie D. Lyle, Durham, NC (US); Vandana Mallempati, Austin, TX (US); Pamela A. Nesbitt, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 2404 days.

(21) Appl. No.: 11/971,666

(22) Filed: Jan. 9, 2008

(65) Prior Publication Data

US 2009/0177969 A1  Jul. 9, 2009

(51) Int. Cl.
*G06F 3/048* (2013.01)
*G07F 17/32* (2006.01)
*G06N 3/00* (2006.01)

(52) U.S. Cl.
CPC ............ *G07F 17/3232* (2013.01); *G06N 3/006* (2013.01); *G07F 17/32* (2013.01); *G07F 17/3234* (2013.01)

(58) Field of Classification Search
CPC . G07F 17/3232; G07F 17/32; G07F 17/3234; G06N 3/006
USPC .................................................. 715/757, 706
See application file for complete search history.

(56) References Cited

U.S. PATENT DOCUMENTS

| 6,119,147 A * | 9/2000 | Toomey et al. ............... 709/204 |
| 2004/0039583 A1 * | 2/2004 | Saito et al. ........................ 705/1 |
| 2007/0233367 A1 * | 10/2007 | Chen et al. ..................... 701/207 |

* cited by examiner

*Primary Examiner* — Tadeese Hailu
*Assistant Examiner* — Darrin Hope
(74) *Attorney, Agent, or Firm* — Jeffrey T. Holman

(57) ABSTRACT

A metaverse system and method for allowing a user to attend a recorded past event in a metaverse application. The metaverse system includes a client computer, a metaverse server, and a time travel engine. The client computer interfaces with the metaverse application. The metaverse server records an event environment of a past event in a metaverse application. The time travel engine serves, in response to a request from a user, a playback of the recorded event environment to the client computer to allow the user to attend and to observe the recorded event environment.

16 Claims, 8 Drawing Sheets

SYSTEM AND METHOD FOR ATTENDING A RECORDED EVENT IN A METAVERSE APPLICATION

BACKGROUND OF THE INVENTION

The term metaverse is widely used to describe a fully immersive 3D virtual space, wherein a virtual environment exists where humans are represented by an avatar and may interact with other user's avatars, both socially and economically, and with software agents in a cyber space. The environment in a metaverse is built upon a metaphor of the real world, but in some cases, without the physical limitations of the real world. In a metaverse application, such as Second Life®, users are allowed to have friends, create groups, and talk and mingle with strangers, fly, and teleport to different locations, and different metaverses.

Currently in a metaverse application, a user is only able to enter the metaverse as it exists in real time and attend an event that is presently taking place at the moment the user is in the metaverse. However, at least one event may have transpired in the past that a user did not attend because the user was not logged on during that time. For example, a user may want to attend a virtual conference held by a company in the metaverse, but the user may not be able to attend the virtual conference because there are two or more events in the metaverse that the user wants to attend that are scheduled during the same time or the user is not able to be in the metaverse at the scheduled time of the event.

Currently in a metaverse application, a user is able to view a list of past, current, and future events. Of the current and past events, the user may choose to attend only those events currently taking place. Although the user may select a past event, the user is simply teleported to the location of the past event, but the activities of the past event are concluded as the past event has since ended and is not currently taking place. In some cases, a user may want to attend an event that has already started, but not yet finished. Although the user could join the event in progress, the user may want to attend the event from the beginning. Thus, the current solution to attend an event in a metaverse application is limited because it does not allow a user to attend and observe past events.

SUMMARY OF THE INVENTION

Embodiments of a system are described. In one embodiment, the system is a metaverse system to allow a user to attend a past event in a metaverse application. An embodiment of the system includes a client computer coupled to a network, a metaverse server coupled to the client computer, and a time travel engine coupled to the metaverse server. The client computer interfaces with the metaverse application. The metaverse server records an event environment of a past event in a metaverse application. The time travel engine serves, in response to a request from a user, a playback of the recorded event environment to the client computer to allow the user to attend and to observe the recorded event environment. Other embodiments of the system are also described.

Embodiments of a method are also described. In one embodiment, the method is a method for recording an event environment of a past event in a metaverse application. An embodiment of the method includes recording an event environment of a metaverse application. The recorded event environment includes a virtual object in a context of a multidimensional virtual scene. The method also includes receiving a request from a user for playback of the recorded event environment. The method also includes displaying the playback of the recorded event environment to allow the user to attend and to observe the recorded event environment. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION OF THE INVENTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments facilitate a user's avatar to attend an immersive three-dimensional recording of a scheduled event that has already started and may have already concluded in a metaverse server. An exemplary metaverse server includes a server for Second Life®. This and other metaverse servers serve a virtual world simulation, or metaverse, through a software application that may be stored and executed on a computer system. Additionally, some embodiments facilitate tracking objects, including avatars, software agents, and inanimate objects associated with the recorded event. Additionally, some embodiments facilitate attending recorded events in a standalone application such as a video game console.

Figure 1:
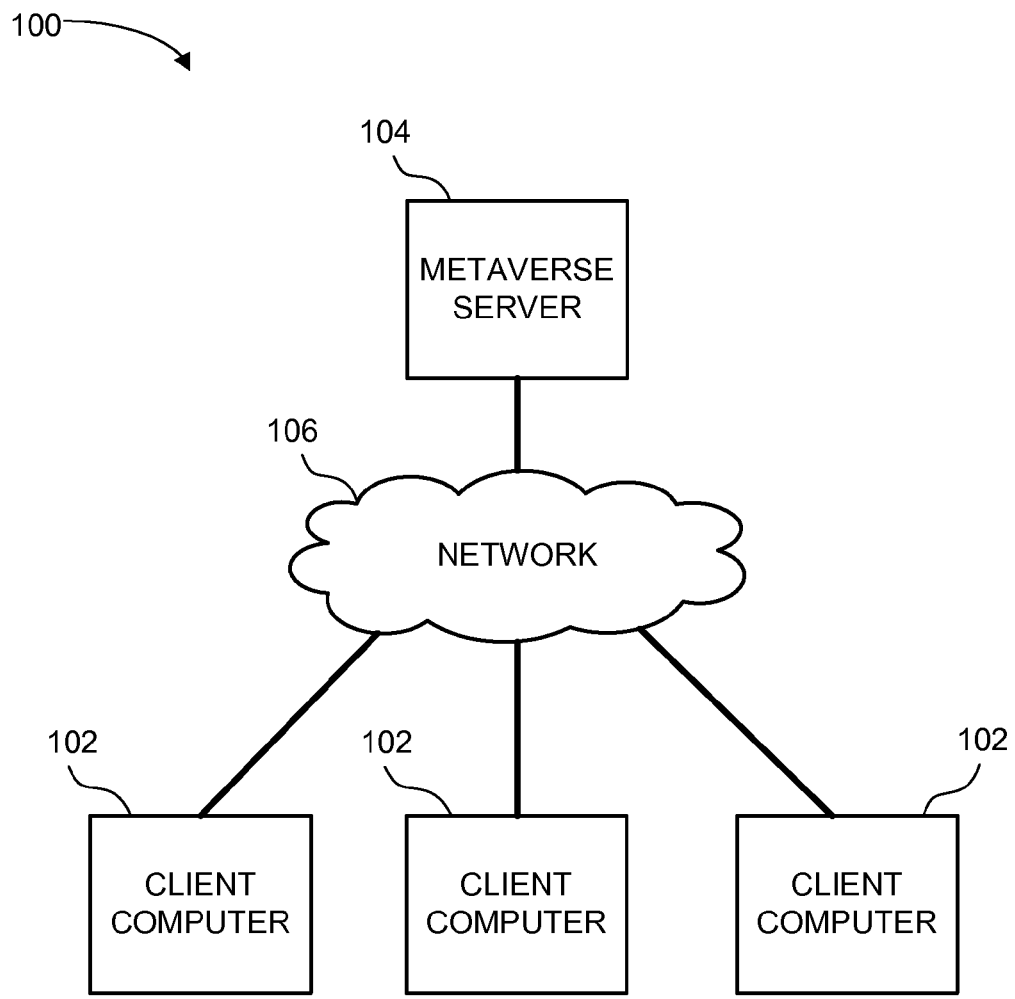
FIG. 1 depicts a schematic diagram of one embodiment of a computer network system.

FIG. 1 depicts a schematic diagram of one embodiment of a computer network system 100. The computer network system 100 may interface a system user and a metaverse server 104 according to the interface operations of a client computer 102. The illustrated computer network system 100 includes a client computer 102, a metaverse server 104, and a network 106. Although the depicted computer network system 100 is shown and described herein with certain components and functionality, other embodiments of the computer network system 100 may be implemented with fewer or more components or with less or more functionality. For example, some embodiments of the computer network system 100 include a plurality of metaverse servers 104 and a plurality of networks 106. Additionally, some embodiments of the computer network system 100 include similar components arranged in another manner to provide similar functionality, in one or more aspects.

The client computer 102 manages the interface between the system user and the metaverse server 104. In one embodiment, the client computer 102 is a desktop or laptop computer. In other embodiments, the client computer 102 is a mobile computing device that allows a user to connect to and interact with a metaverse. In some embodiments, the client computer 102 is a video game console. The client computer 102 is connected to the metaverse server 104 via a local area network (LAN) or other type of network 106.

The metaverse server 104 hosts a simulated virtual world, the metaverse, to a plurality of client computer 102. In one embodiment, the metaverse server 104 is an array of servers. In this embodiment, a specified area of the metaverse is simulated by a single server instance, and multiple server instances may be run on a single metaverse server 104. In some embodiments, the metaverse server 104 includes a plurality of simulation servers dedicated to physics simulation in order to manage interactions and handle collisions between characters and objects in a metaverse, as well as a plurality of storage servers, apart from the plurality of simulation servers, dedicated to storing data related to objects and characters in the metaverse world. The data stored on the plurality of storage servers may include object shapes, avatar shapes and appearances, audio clips, metaverse related scripts, and other metaverse related objects. The plurality of storage servers may also store data associated with a recorded event, as described in greater detail below in relation to FIG. 3.

The network 106 may communicate traditional block I/O over, for example, a storage area network (SAN). The network 106 may also communicate file I/O, such as over a transmission control protocol/internet protocol (TCP/IP) network or similar communication protocol. In some embodiments, the computer network system 100 includes two or more networks 106. In some embodiments, the client computer 102 may be connected directly to a metaverse server 104 via a backplane or system bus. In one embodiment, the network 106 may include a cellular network, another type of network, or a combination of networks.

Figure 2:
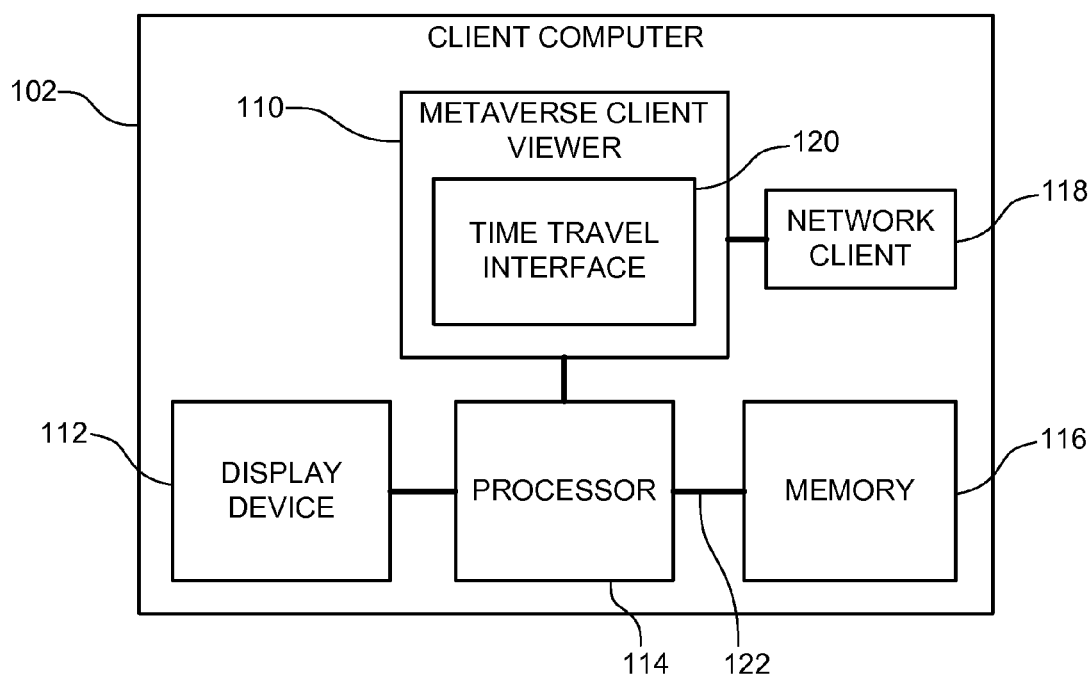
FIG. 2 depicts a schematic block diagram of one embodiment of a client computer of the computer network system of FIG. 1.

FIG. 2 depicts a schematic block diagram of one embodiment of a client computer 102 of the computer network system 100 of FIG. 1. The illustrated client computer 102 includes a metaverse client viewer 110, a display device 112, a processor 114, an electronic memory device 116, a network client 118, and one or more bus interfaces 122. In one embodiment, the bus interfaces 122 facilitate communications related to software associated with the metaverse application 130 executing on the client computer 102, including processing metaverse application commands, as well as storing, sending, and receiving data packets associated with the application software of the metaverse. Although the depicted client computer 102 is shown and described herein with certain components and functionality, other embodiments of the client computer 102 may be implemented with fewer or more components or with less or more functionality.

In one embodiment the client computer 102 of FIG. 2 implements the metaverse client viewer 110 coupled to a metaverse server 104 attached to the network 106 of FIG. 1. In some embodiments, the metaverse client viewer 110 is stored in the electronic memory device 116 or a data storage device within a client computer 102. In the same embodiment, the metaverse client viewer 110 includes processes and functions which are executed on a processor 114 within a client computer 102.

In one embodiment, the metaverse client viewer 110 is a client program executed on the client computer 102. In this embodiment, the metaverse client viewer 110 enables a user on a client computer 102 to connect to a metaverse server 104 over a network 106. The metaverse client viewer 110 is further configured to enable the user on the client computer 102 to interact with other users on other client computers 102 that are also connected to the metaverse server 104. The depicted metaverse client viewer 110 includes a time travel interface 120 to allow the user to attend a recorded event. In particular, the user may attend from the beginning a recorded event that has already started or a recorded event that has already concluded. Embodiments of the process of attending a recorded event are described in further detail below in relation to FIG. 3.

In some embodiments, the display device 112 is a graphical display such as a cathode ray tube (CRT) monitor, a liquid crystal display (LCD) monitor, or another type of display device. In one embodiment, the display device 112 is configured to convey a visual representation of a metaverse virtual world, as well as control and configuration tools to control and configure aspects of a recorded event.

In one embodiment, the processor 114 is a central processing unit (CPU) with one or more processing cores. In other embodiments, the processor 114 is a graphical processing unit (GPU) or another type of processing device such as a general purpose processor, an application specific processor, a multi-core processor, or a microprocessor. Alternatively, a separate GPU may be coupled to the display device 112. In general, the processor 114 executes one or more instructions to provide operational functionality to the client computer 102. The instructions may be stored locally in the processor 114 or in the electronic memory device 116. Alternatively, the instructions may be distributed across one or more devices such as the processor 114, the electronic memory device 116, or another data storage device.

In some embodiments, the electronic memory device 116 is a random access memory (RAM) or another type of dynamic storage device. In other embodiments, the electronic memory device 116 is a read-only memory (ROM) or another type of static storage device. In other embodiments, the illustrated memory device 116 is representative of both RAM and static storage memory within a single computer network system 100. In other embodiments, the electronic memory device 116 is an electronically programmable read-only memory (EPROM) or another type of storage device. Additionally, some embodiments store the instructions as firmware such as embedded foundation code, basic input/output system (BIOS) code, or other similar code.

The network client 118, in one embodiment, facilitates initial connections between the client computer 102 and the metaverse server 104 in response to a user on the client computer 102 requesting to login to the metaverse server 104 and to maintain a connection established between the client computer 102 and the metaverse server 104. In this same embodiment, the network client 118 handles communications and commands, on the client side, between the client computer 102 and the metaverse server 104. The communications and commands are exchanged over the network 106.

In one embodiment, the client computer 102, the display device 112, the processor 114, the electronic memory device 116, the network client 118, and other components within the computer network system 100 may be coupled to one or more bus interfaces 122. The bus interfaces 122 may be configured for simplex or duplex communications of data, address, and/or control information.

Figure 3:
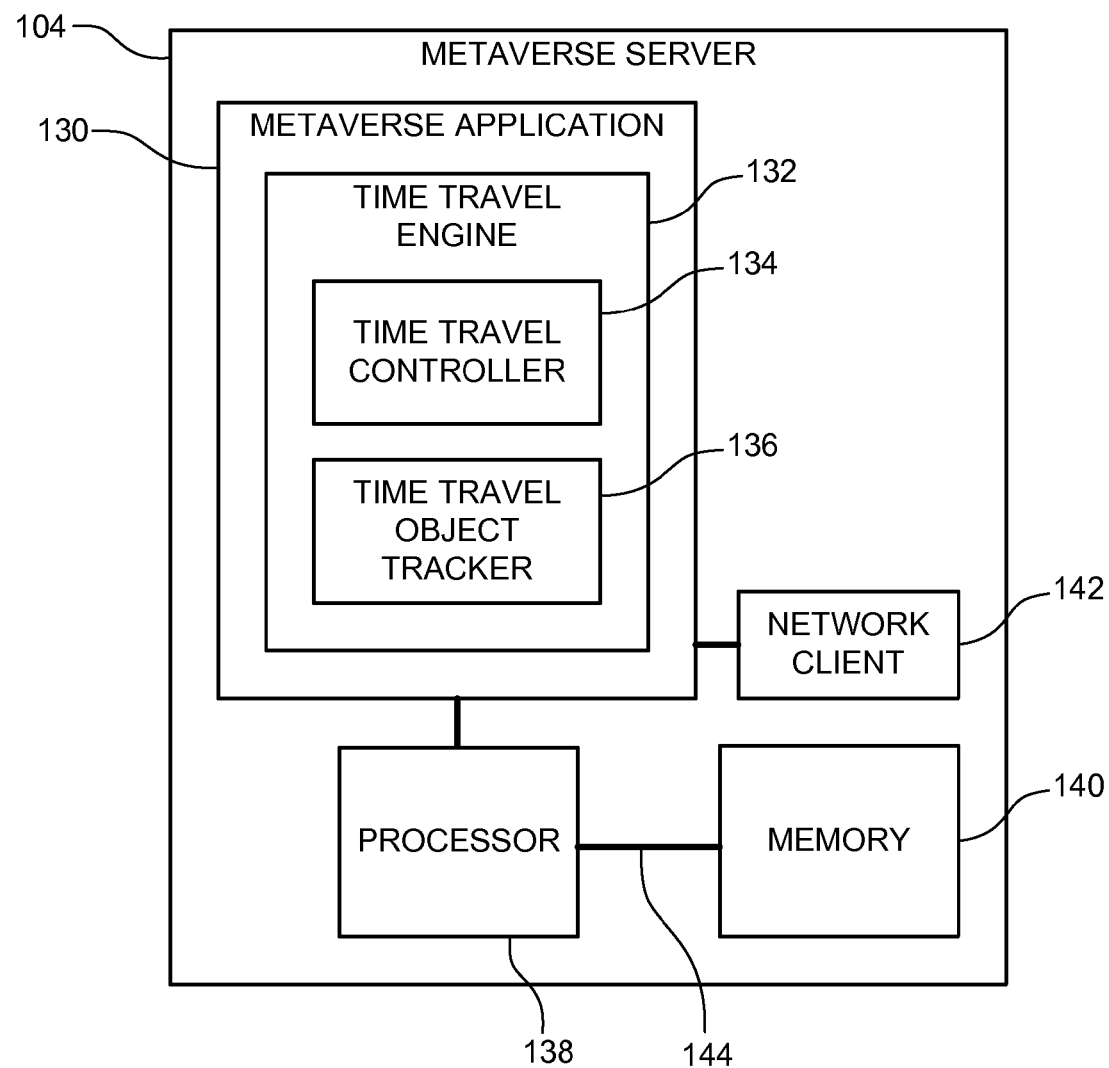
FIG. 3 depicts a schematic diagram of one embodiment of a metaverse server with a time travel engine for use in association with the time travel interface of FIG. 2.

FIG. 3 depicts a schematic diagram of one embodiment of a metaverse server 104 with a time travel engine 132 for use in association with the time travel interface 120 of FIG. 2. The illustrated metaverse server 104 includes a metaverse application 130, a processor 138, an electronic memory device 140, a network client 142, and one or more bus interfaces 144 to facilitate communications related to a metaverse application 130 executing on the metaverse server 104, including processing metaverse application commands, as well as storing, sending, and receiving data packets associated with the metaverse application 130. Although the depicted metaverse server 104 is shown and described herein with certain components and functionality, other embodiments of the metaverse server 104 may be implemented with fewer or more components or with less or more functionality. Other embodiments of the metaverse server 104 of FIG. 3 implement the metaverse application 130 coupled to a client computer 102 attached to the network 106 of FIG. 1. In some embodiments, the metaverse client viewer 110 is stored in the electronic memory device 116 or a data storage device within a client computer 102. In some embodiments, the metaverse application 130 includes processes and functions which are executed on a processor 138 within the metaverse server 104. In a further embodiment, the metaverse application 130 may be executed on a metaverse server within a client computer 102.

The illustrated metaverse server 104 of FIG. 3 includes many of the same or similar components as the client computer 102 of FIG. 2. These components are configured to operate in substantially the same manner described above, except as noted below.

The depicted metaverse application 130 also includes a time travel engine 132. In one embodiment, the metaverse application 130 simulates a fully immersive three-dimensional virtual space, or metaverse, that a user on a client computer 102 may enter as an avatar and interact with other avatars and objects in the metaverse via the metaverse client viewer 110. Thus, a plurality of users, each on their own client computer 102, may interact with each other and other simulated objects within the metaverse.

The depicted time travel engine 132 includes a time travel controller 134 and a time travel object tracker 136. The time travel engine 132 records an event environment in a metaverse as an immersive three-dimensional environment, allowing a user to attend the event at a time after the scheduled start time of the event. The recorded event environment may include an avatar present at the event, an action of the avatar at the event, an inanimate object present at the event, and the actions acted upon the inanimate object, among other things. Thus, the recorded event environment displays any animate and inanimate objects present at the event and any related actions associated with the animate and inanimate objects present at the event, as recorded objects and recorded actions, respectively. The recorded event is a compilation of the recorded objects and recorded actions that happen within the recorded event environment in a chronological order of the event that was recorded.

In one embodiment, a user requests, via the time travel interface 120, to record an event environment as an immersive three-dimensional environment. Thus, the recorded event environment is an immersible environment, in that an avatar may be placed within the recorded event environment. In other words, the avatar is displayed in the recorded event environment alongside recorded objects and recorded actions associated with the recorded event environment, similar to the manner in which the avatar may be displayed in the three-dimensional world of the metaverse in real time. In this embodiment, an avatar that observes the recorded event environment is not able to interact with the recorded objects in the same manner that the avatar is able to interact with objects in the metaverse in real time. However, the avatar that observes the recorded event environment, in some embodiments, may be able to observe metadata associated with a recorded object in the recorded event environment. More detail on observing metadata of recorded objects is discussed below in relation to the time travel object tracker 136.

For example, a company may hold a conference in a certain location for a scheduled amount of time, and an employee that wanted to attend the company conference may not have been available to attend the conference during the scheduled time. In one embodiment, a user, such as a representative of the company, may request to record the environment of the conference in order to attend the conference after the conference has ended. In another embodiment, a user, such as the representative of the company, may request to record the environment of the conference in order to allow another user to attend the conference after the conference has ended. Thus, another user may request, via the time travel interface 120, to open the recorded conference environment, including recorded objects and recorded actions associated with the recorded conference environment. The time travel engine 132 then receives the request and opens the recorded conference environment so that the other user may observe the conference.

In one embodiment, a user may enter a partially recorded event after the event has started and before the event has ended. In this embodiment, the user may remain in the partially recorded event throughout the duration of the recording until the recording of the event concludes. Likewise, the user may fast forward the partially recorded event to the real time of the metaverse and the real time of the ongoing current event, and in so doing, exit the partially recorded event, and enter the current event in real time. Similarly, the user may attend an event in real time, wherein a recording of the event is ongoing, and thus, may rewind the event, and in so doing, exit the current event, and enter the recorded event.

In some embodiments, a user controls the recorded event, wherein the user interfaces with the time travel controller 134 through the time travel interface 120 on a client computer 102. In one embodiment, the time travel controller 134 saves a stop point associated with the recorded event. In other words, a user may stop the recorded event before reaching the end of the recorded event, and the time travel controller 134 marks the present stop point for the recorded event. This allows the user to attend the rest of the recorded event at a later time, continuing the recorded event from the marked stop point. More detail on controlling a playback of a recorded event is discussed below in relation to the playback control interface 200 of FIG. 5.

Accordingly, the time travel engine 132 provides a function within the metaverse application 130 in which one or more users within a metaverse can attend from the beginning an event that has already started and may have concluded. The recorded event may be identical in every three-dimensional aspect as the event in the real-time metaverse, insofar as the specific dimensions of the recorded event are concerned. Also, although the user that attends the recorded event may interact with other users that attend the recorded event, at least in some embodiments a user that attends a recorded event cannot interact with the objects and avatars that appear as part of the recording, as they were present at the event in its original space and time when the event was recorded.

In one embodiment, the time travel engine 132 stores the recorded event on an electronic memory device 140 or other storage device associated with the metaverse server 104. In some embodiments, the recorded event is stored on a client computer 102. Alternatively, the recorded event may be stored on the metaverse server 104 and the client computer 102.

In one embodiment, a user requests, via the time travel interface 120, to record only inanimate objects in an event environment. In this embodiment, the recorded event environment is still an immersible environment that an avatar may be placed within, but the recorded event does not include recorded avatars and recorded actions. Instead the recorded event environment is a snapshot of all the inanimate objects that were present when the event was recorded.

For example, a user may hold a yard sale in a certain location for a scheduled amount of time. The user may then clear the space at the end of the yard sale so that the space may be used for another purpose. However, the user may have some items that did not sell during the yard sale. Additionally, another user that wanted to attend the yard sale may not have been available to attend during the scheduled time. Thus, the user that holds the yard sale and/or a different user that wants to attend the yard sale may request to record the yard sale environment, but may not want to include the avatars present at the yard sale and their associated actions in the recorded event. So the user may request to include in the recorded yard sale environment only the items that are for sale, the inanimate objects, at the yard sale. The other user that was not able to attend the yard sale during the scheduled time may open and observe the recorded yard sale environment and browse the items that were for sale during the scheduled time of the yard sale. Furthermore, as discussed above, the other user may observe metadata associated with the items displayed in the recorded yard sale environment and determine whether an item that was not sold at the yard sale is still available in real time for sale. More detail on observing metadata of recorded objects is discussed below in relation to the time travel object tracker 136.

In one embodiment, the time travel engine records an event as a two dimensional recorded event. The recorded event is viewable as a two-dimensional recording, similar to a video recording in the real world which is viewed on a viewing device, and may be observed by watching the recorded event on a simulated television or other simulated viewing device in the metaverse.

In one embodiment, the time travel controller 134 configures a recorded event, such as a start time and an end time for the recorded event. The time travel controller 134 may also specify the dimensions of the immersive three-dimensional recorded event. In some embodiments, the time travel controller 134 configures the recorded event in response to a request from the controller of the recorded event to configure the recorded event. In a further embodiment, the time travel controller 134, as requested by the controller of the recorded event, sends an invitation to another user, as specified by the controller, to attend the recorded event. In some embodiments, a user may block another user from attending the recorded event.

In some embodiments, the time travel controller 134 connects the user that receives and accepts the invitation to attend the recorded event. Other functions of the time travel controller 134 may include saving the recorded event on the electronic memory device 116 on the client computer 102 or another type of storage device accessible to the client computer 102. Alternatively, the recorded event may be saved on the electronic memory device 140 on the metaverse server 104 or other type of storage device accessible to the metaverse server 104. In a further embodiment, the recorded event may be saved on both the client computer 102 and the metaverse server 104.

In one embodiment, the time travel engine 132 may implement a global limit on a maximum recordable space and a global limit on a maximum recordable time. Thus, the global limits on maximum recordable space and maximum recordable time would be enforced throughout the entire metaverse as a maximum three-dimensional size a recorded event may encompass, and a maximum length of time an event may be recorded, respectively. In other words, an event that takes place in a single room for one hour may be recorded as an immersive three-dimensional environment that encompasses the three-dimensional space of that single room and the specified hour of the event. Likewise, according to the maximum recordable space and the maximum recordable time, in this embodiment, a user may not record an event that encompasses the three-dimensional limits of the entire metaverse for an indefinite amount of time.

The time travel object tracker 136 tracks metadata of an object associated with the recorded event. The object may be any two or three dimensional object that is present at the event at any time during which the current event is recorded. In other words, the time travel object tracker 136 tracks any inanimate object that was present at the event in its original space and time when the event was recorded. In one embodiment, the time travel object tracker 136 communicates the metadata of a tracked object associated with the recorded event to a user in attendance at a recorded event. In some embodiments, the time travel object tracker 136 facilitates the exchange of ownership of an object for sale that is associated with the recorded event in response to a purchase of the object for sale by the user in attendance at the recorded event in combination with a determination that the metadata of the object for sale is unsold. The time travel object tracker 136 may then update the present state of the object associated with the recorded event in response to a detected change in the metadata of the object associated with the recorded event, such as the purchasing of an object in the recorded event. In other words, the travel object tracker 136 is capable of tracking metadata for objects from the recorded event even after the corresponding event ends.

Figure 4:
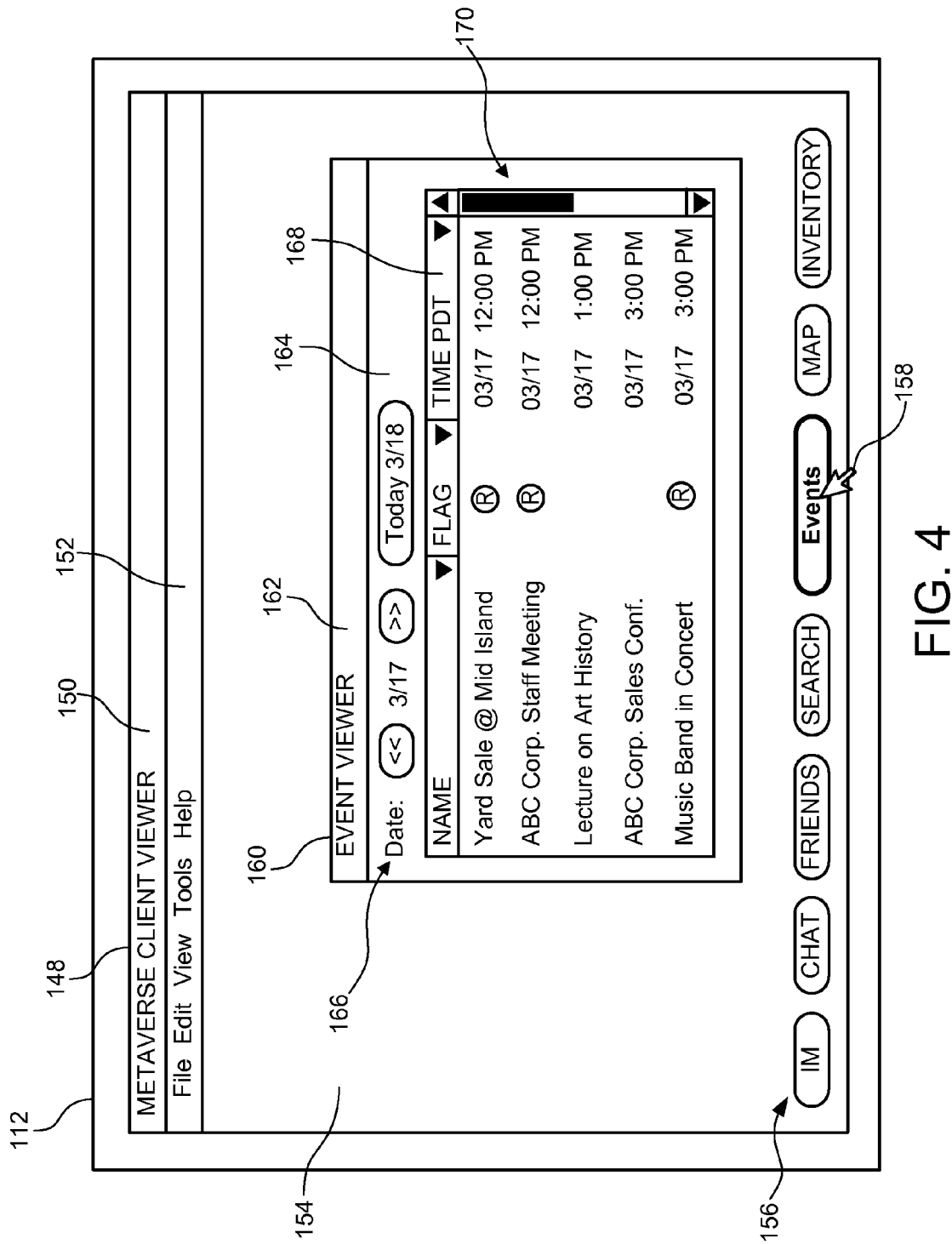
FIG. 4 depicts a schematic diagram of one embodiment of an event viewer for use with the time travel interface of FIG. 2.

FIG. 4 depicts a schematic diagram of one embodiment of an event viewer 160 for use with the time travel interface 120 of FIG. 2. In particular, the metaverse client viewer 148 shows the event viewer 160 within a graphical user interface (GUI) for display on a display device 112. It should be noted that other embodiments of the event viewer 160 may be integrated with existing or new interfaces that are used to display related information.

The illustrated metaverse client viewer 148 includes a title bar 150 to show a title of the metaverse client viewer 148, a menu bar 152 to show possible menu selections within the metaverse client viewer 148, a viewing space 154 to show a metaverse within the metaverse client viewer 148, a plurality of metaverse client viewer control buttons 156, including an Events button, and the event viewer 160 to show a plurality of scheduled events within the metaverse client viewer 148. The illustrated metaverse client viewer 148 also depicts a user clicking on the Event control button with a mouse cursor 158, which, in one embodiment, opens the event viewer 160.

The illustrated event viewer 160 includes a title bar 162 to show a title of the event viewer 160, an event viewer viewing space 164 to show a plurality of event viewer options, and a plurality of event viewer control buttons 166, which may include a previous-date button, a subsequent-date button, and a present-date button. Other embodiments may include fewer or more event viewer options. The present-date button allows a way for the user to return to a view of events of the current time and day with a single click of the present-date button. The previous-date button and the subsequent-date button allow a user to scroll through a view of past events, current events, and future scheduled events.

The illustrated event viewer 160 also includes a list sorter 168 to sort a list of events 170 according to headers in the list sorter 168, such as the name of the event, the date of the event, and whether a past event is a recorded event. In the depicted list of events 170, the recorded events are indicated, for example, with an encircled letter "R" under the flag header of the list sorter 168. Other embodiments may indicate that a past event is a recorded event in a different manner.

Figure 5:
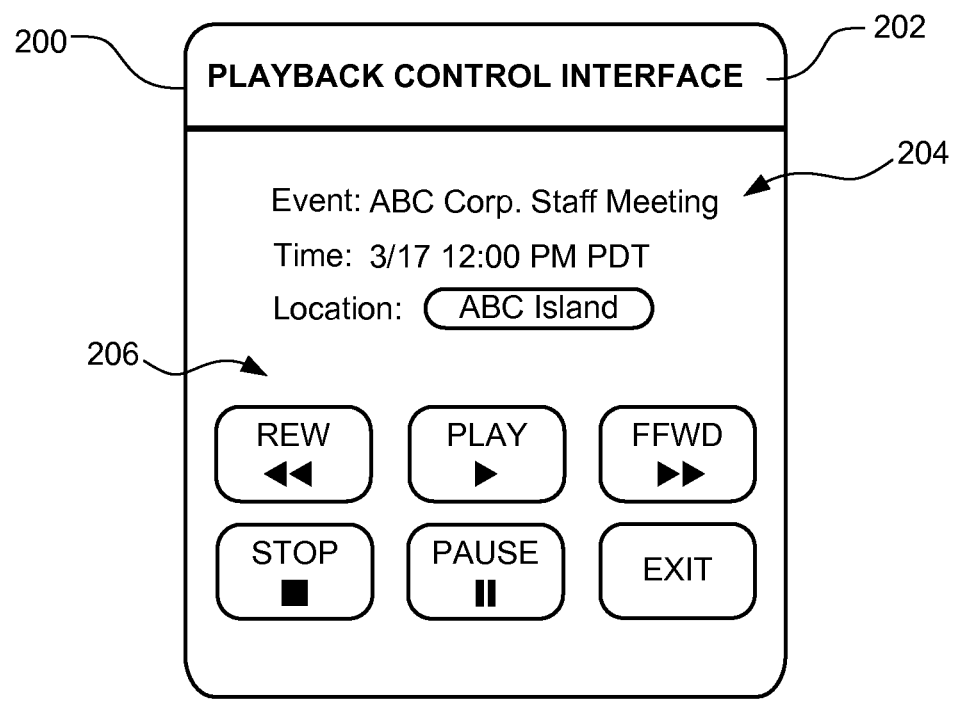
FIG. 5 depicts a schematic diagram of one embodiment of a time travel controller for use with the time travel interface of FIG. 2.

FIG. 5 depicts a schematic diagram of one embodiment of a playback control interface 200 for use with the time travel interface 120 of FIG. 2. In particular, the playback control interface 200 shows a plurality of playback functions associated with a recorded event. It should be noted that other embodiments of the playback control interface 200 may be integrated with existing or new interfaces that are used to display related information.

The illustrated playback control interface 200 includes a title bar 202 to show a title of the playback control interface 200, a playback control interface body 204 to show the details of the recorded event, such as event title, event time, and event location, as well as playback control buttons 206, wherein a user controls the playback of a recorded event with a play button, a rewind button, a fast forward button, a stop button, a pause button, and an exit button. Other embodiments may include fewer or more playback control options.

In one embodiment, a user opens the playback control interface 200 through a menu in the metaverse client viewer 148. In other embodiments, the user interfaces the playback control interface 200 with assigned keystrokes of a keyboard (not shown) attached to the client computer 102, or assigned functions of other human interface devices not shown, such as a mouse. For example, the user may start the playback of the past event by typing the "P" key on a keyboard, stop the playback of the recorded event by typing the "S" key, and pause the playback by typing the spacebar, etc.

In some embodiments, a user may stop a recorded event that is presently playing, and the time travel engine 132 bookmarks the stop point. The user may then close the recorded event and exit the metaverse. The user, at a later time, may then reopen the same recorded event and resume playing the recorded event from the stop point that was bookmarked previously by the time travel engine 132.

In one embodiment, the plurality of playback functions of a recorded event operate similar to playback functions of a media player such as a DVD player. In some embodiments, the playback control interface may include a skip to function to allow a user to play the recorded event environment from a point of time in the recorded event environment selected by the user.

For example, a user may attend a recorded event of a lecture, and at some point during the playback of the recorded lecture, the user may have a question regarding what the recorded lecturer says in the recorded lecture. The user may then pause the recorded lecture with the playback control interface, and interact with fellow users, if any, that are presently observing the recorded lecture with the user. Thus, the user may discuss the question regarding what the recorded lecturer says with the fellow observers. Furthermore, in some embodiments, by observing the metadata of the recorded lecturer, via the time travel object tracker 136, the user may determine that the lecturer is currently online in the metaverse. The user may then pause the proceedings of the recorded lecture, and, while still in the recorded event environment of the lecture, ask the lecturer about the question regarding what the lecturer says in the recorded lecture, such as with chat or IM. The user may then receive an answer from the lecturer, while the user is still in the recorded event environment of the lecture, and subsequently restart the recorded lecture having received an answer to the question.

Figure 6:
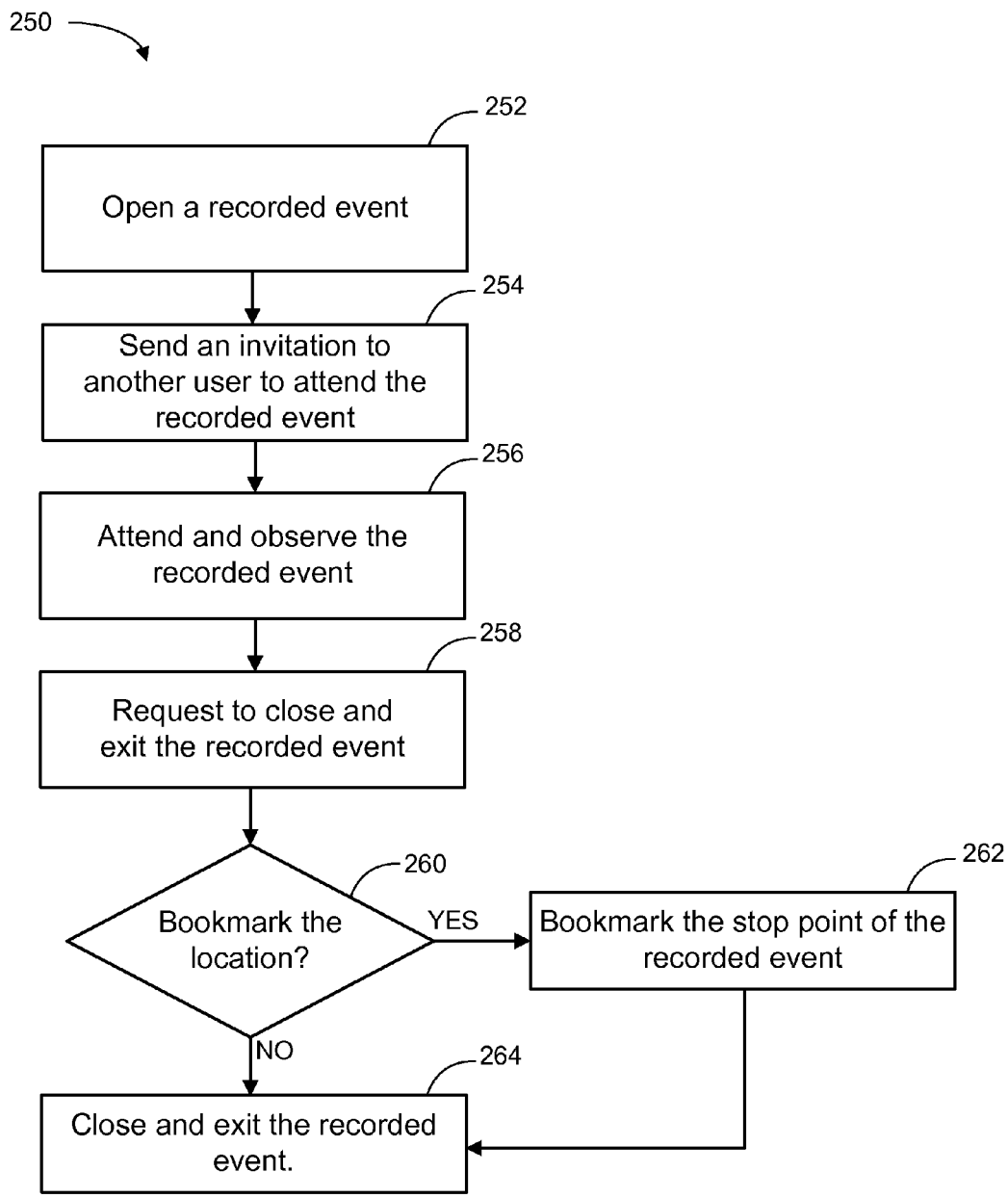
FIG. 6 depicts a schematic flow chart diagram of one embodiment of a recorded event attendance method for use with the time travel engine of FIG. 3.

FIG. 6 depicts a schematic flow chart diagram of one embodiment of a recorded event attendance method 250 for use with the time travel engine 132 of FIG. 3. For ease of explanation, the recorded event attendance method 250 is described with reference to the time travel engine 132 of FIG. 3. However, some embodiments of the recorded event attendance method 250 may be implemented with other time travel engines. Additionally, the recorded event attendance method 250 is described in conjunction with the time travel interface 120 of FIG. 2, but some embodiments of the recorded event attendance method 250 may be implemented with other time travel interfaces.

In the illustrated recorded event attendance method 250, the time travel engine 132 opens 252 a recorded event, and a user, in one embodiment, requests to open the recorded event via the time travel interface 120. In some embodiments, the time travel engine 132 sends 254 an invitation to another user to attend the recorded event. For example, the user that requests to open the recorded event may request that the invitation to be sent to the other user. The user then attends and observes 256 the recorded event, and the other user that accepts the invitation attends and observes 256 the recorded event with the user. Alternatively, another user may attend and observe 256 the recorded event with the user regardless of receiving or accepting an invitation. In some embodiments, a user may block any other user from attending and observing 256 the recorded event.

At any time during the playback of the recorded event, the users attending the recorded event may interact with each other in a manner similar to interactions between two users in the real-time metaverse. In one embodiment, as described above in relation to FIG. 3, the event environment is recorded in two dimensions. Thus, the user may request to open 252 and observe 256 a two dimensional recorded event.

At some point, the user may request 258, via the time travel interface 120, that the time travel engine 132 close and exit the recorded event, in which case the user and any other user in attendance at the recorded event exit the recorded event. However, the time travel engine 132 may prompt the user to determine 260 whether to bookmark the present location in the playback of the recorded event and, if so, the time travel engine 132 bookmarks 262, for that particular user, the present location in the playback of the recorded event. Then the time travel engine 132 closes 264 the recorded event, and the user and any other users in attendance at the recorded event exit the recorded event. Otherwise, the time travel engine 132 just closes 264 the recorded event, and the user and any other users in attendance at the recorded event exit the recorded event without saving a bookmark.

In one embodiment, the metaverse server 104 stores the bookmark on the electronic memory device 140 or a storage device coupled to the metaverse server 104. In another embodiment, the client computer 102 stores the bookmark on the electronic memory device 116 or a storage device coupled to the client server 102. Alternatively, the bookmark is stored on both the metaverse server 104 and the client computer 102.

Figure 7:
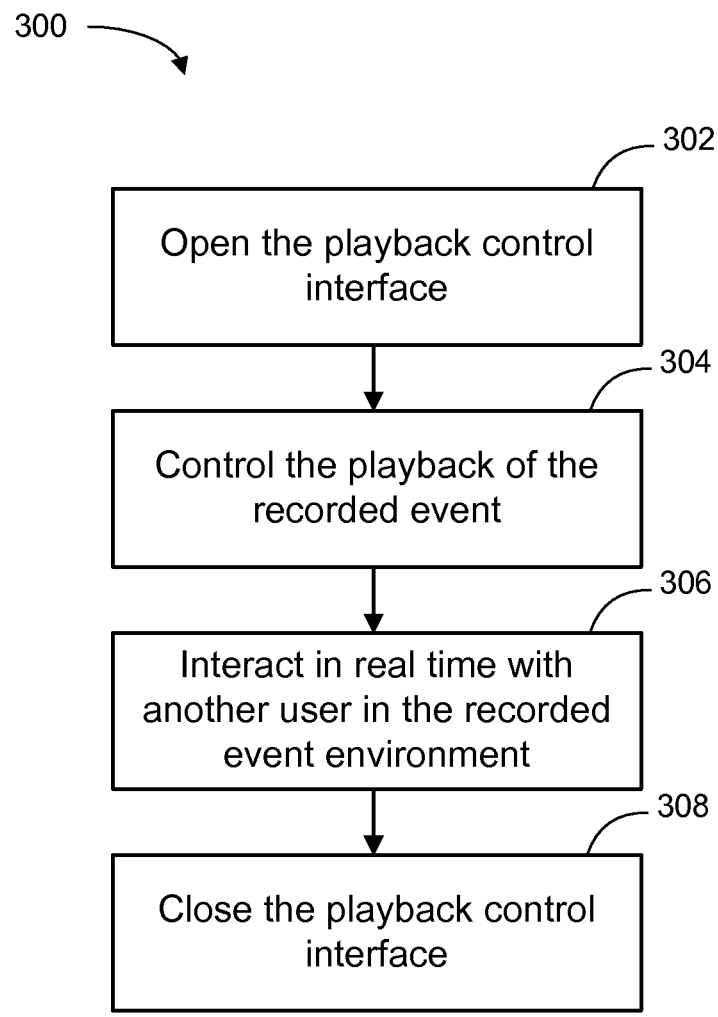
FIG. 7 depicts a schematic flow chart diagram of one embodiment of a recorded event controlling method for use with the time travel engine of FIG. 3.

FIG. 7 depicts a schematic flow chart diagram of one embodiment of a recorded event controlling method 300 for use with the time travel engine 132 of FIG. 3. For ease of explanation, the recorded event controlling method 300 is described with reference to the time travel engine 132 of FIG. 3. However, some embodiments of the recorded event controlling method 300 may be implemented with other time travel engines. Additionally, the recorded event controlling method 300 is described in conjunction with the time travel interface 120 of FIG. 2, but some embodiments of the recorded event controlling method 300 may be implemented with other time travel interfaces.

In the illustrated recorded event controlling method 300, the time travel controller 134 opens 302 the playback control interface 200 and a user, in one embodiment, requests to open the playback control interface 200 via the time travel interface 120. The user then interfaces with the time travel controller 134 through the time travel interface 120 to control 304 the playback of a recorded event that the user is presently attending and observing 256. Thus, the recorded event controlling method 300 may be implemented in conjunction with the recorded event attendance method 250 in relation to FIG. 6.

In some embodiments, the user may attend and observe 256 the recorded event with at least one other user and may select the pause function of the playback control interface 200 to pause the recorded event in order to interact 306 in real time with the other user while the users remain in the recorded event environment. The user may then select the play function of the playback control interface 200 to continue playing the recorded event from the point that the recorded event was paused. Alternatively, the users may interact 306 at any point during the playback of the recorded event, whether the playback of the recorded event is paused, in play, stopped, in rewind, or in fast forward, etc. At some point during the playback of the recorded event, the user may request the time travel controller 134 to close 308 the playback control interface 200.

In some embodiments, the user may stop the playback of the recorded event, in which the stop point may be bookmarked 262 and the recorded event closed 264 by the time travel engine 132, as described in relation to FIG. 6, and the user may at least temporarily exit the recorded event, along with any other users attending and observing 256 the recorded event. The users that exit the recorded event may then interact 306 with each other and other users in the metaverse in real time, outside of the recorded event environment. The user may then reopen and restart the recorded event, continuing from the stop point bookmarked by the time travel engine 132.

Figure 8:
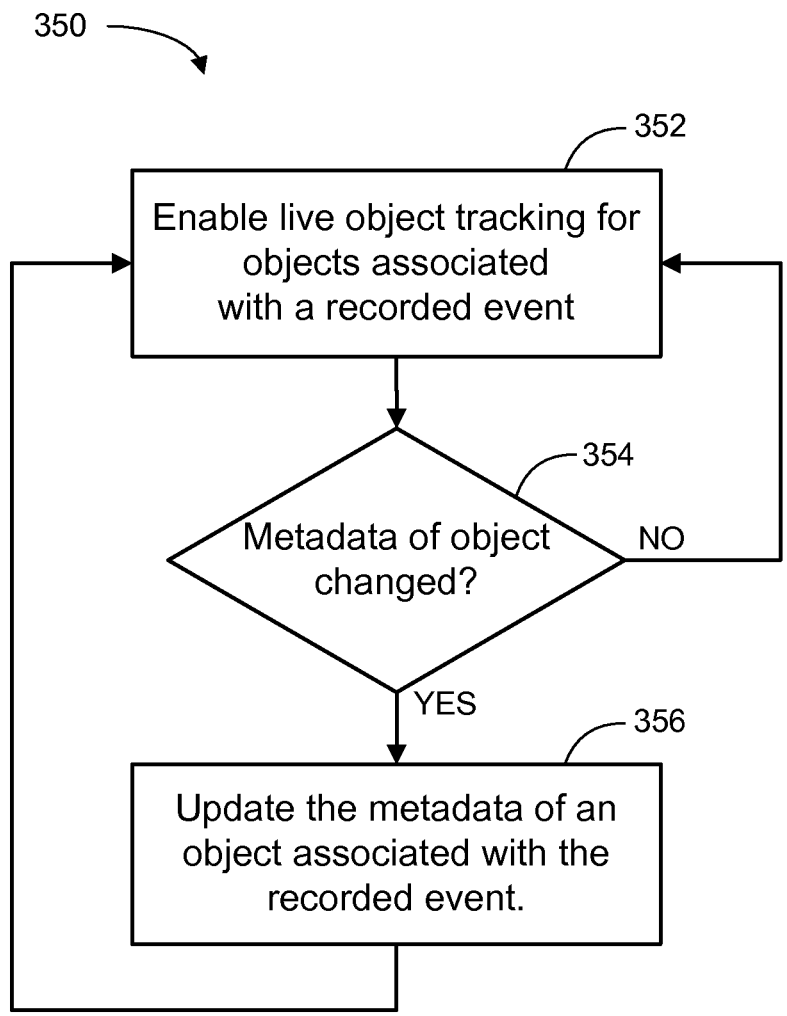
FIG. 8 depicts a schematic flow chart diagram of one embodiment of an object tracking method for use with the time travel engine of FIG. 3.

FIG. 8 depicts a schematic flow chart diagram of one embodiment of an object tracking method 350 for use with the time travel engine 132 of FIG. 3. For ease of explanation, the object tracking method 350 is described with reference to the time travel engine 132 of FIG. 3. However, some embodiments of the object tracking method 350 may be implemented with other time travel engines. Additionally, the object tracking method 350 is described in conjunction with the recorded event attendance method 250 of FIG. 6, but some embodiments of the object tracking method 350 may be implemented with other recorded event attendance methods.

In the illustrated object tracking method 350, the time travel object tracker 136 provides 352 live object tracking for recorded objects, as described above in relation to FIG. 3, associated with a recorded event. The time travel object tracker 136 provides 352 live object tracking in that the time travel object tracker 136 continuously monitors the metadata of a recorded object associated with a recorded event even after the recorded event ends. In one embodiment, when there is no user attending a particular recorded event, the time travel object tracker 136 does not provide live object tracking. In other words, recorded objects associated with a recorded event are continuously tracked by the time travel object tracker 136 regardless of whether or not a user is in attendance at the associated recorded event.

The time travel object tracker 136, while a user attends and observes 256 a recorded event, then determines 354 whether the metadata of a recorded object associated with the recorded event is altered, and if so, the time travel object tracker 136 then updates 356 the metadata of the recorded object. Thus, a user may observe, in real time, metadata of a recorded object associated with a recorded event while in attendance during the playback of the recorded event.

Embodiments of the system and method of the metaverse time travel process described can have a real and positive impact on improving the usability of a metaverse application 130, by providing a process of attending past events in the metaverse. Additionally, some embodiments facilitate improving usability of interfaces in the metaverse, by providing a process to purchase items of past sales events. Thus, by eliminating the requirement to be in the metaverse at the same time an event transpires, a users experience in the metaverse is improved and enhanced.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to record an event environment, wherein the recorded event environment is stored on a storage device, and operation to receive a request from a user for playback of the recorded event environment, and an operation to display the playback of the recorded event environment to allow the user to observe the recorded event environment.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program that, when executed on a computer, causes the computer to perform operations comprising:
   record an event environment of a metaverse application, wherein the recorded event environment comprises a virtual object in a context of a multidimensional virtual scene;
   receive a request from a user for playback of the recorded event environment;
   display the playback of the recorded event environment to allow the user to observe the recorded event environment; and
   facilitate an interaction between at least two avatars within the recorded environment, wherein the interaction occurs during the playback of the recorded event environment.

2. The computer program product of claim 1, wherein the computer readable program, when executed on the computer, causes the computer to perform operations to track metadata of the virtual object in the recorded event environment.

3. The computer program product of claim 2, wherein the computer readable program, when executed on the computer, causes the computer to perform operations to communicate the metadata of the virtual object to the user during the playback of the recorded event environment.

4. The computer program product of claim 2, wherein the computer readable program, when executed on the computer, causes the computer to perform operations to update a status of the metadata of the virtual object associated with the recorded event environment.

5. The computer program product of claim 1, wherein the computer readable program, when executed on the computer, causes the computer to perform operations to control at least one of a plurality of playback functions of the recorded event environment, wherein the plurality of playback functions comprises a play function, a rewind function, a fast forward function, a stop function, a pause function, a bookmark function, a skip to function, and an exit function.

6. A system comprising:
   a client computer coupled to a network;
   a metaverse server coupled to the client computer, the metaverse server to record an event environment of a metaverse application, the recorded event environment comprising a virtual object in a context of a multidimensional virtual scene, wherein the recorded event environment is stored on a storage device; and
   a time travel engine coupled to the metaverse server, the time travel engine to serve, in response to a request from a user, a playback of the recorded event environment to the client computer to allow the user to attend and to observe the recorded event environment, wherein the time travel engine is configured to facilitate an interaction between at least two avatars within the recorded environment, wherein the interaction between at least two avatars occurs during the playback of the recorded event environment.

7. The system of claim 6, wherein the time travel engine comprises a time travel controller, the time travel controller to control at least one of a plurality of playback functions of the recorded event environment, wherein the plurality of playback functions comprises a play function, a rewind function, a fast forward function, a stop function, a pause function, a bookmark function, a skip to function, and an exit function.

8. The system of claim 6, wherein the time travel engine comprises a time travel object tracker, the time travel object tracker to track metadata of the virtual object in the recorded event environment.

9. The system of claim 8, the time travel object tracker is further configured to communicate the metadata of the virtual object to the user during the playback of the recorded event environment.

10. The system of claim 8, the time travel object tracker is further configured to update a status of the metadata of the virtual object associated with the recorded event environment.

11. A method comprising:
   recording an event environment of a metaverse application on a hardware device, wherein the recorded event environment comprises a virtual object in a context of a multidimensional virtual scene;
   receiving a request from a user for playback of the recorded event environment;
   displaying the playback of the recorded event environment to allow the user to attend and to observe the recorded event environment; and
   facilitating an interaction between at least two avatars within the recorded environment, wherein the interaction of the at least two avatars occurs during the playback of the recorded event environment.

12. The method of claim 11, further comprising:
   tracking metadata of the virtual object in the recorded event environment;
   communicating the metadata of the virtual object to the user during the playback of the recorded event environment; and
   updating a status of the metadata of the virtual object associated with the recorded event environment.

13. The method of claim 11, wherein the method further comprises controlling at least one of a plurality of playback functions of the recorded event environment, wherein the plurality of playback functions comprises a play function, a rewind function, a fast forward function, a stop function, a pause function, a bookmark function, a skip to function, and an exit function.

14. A metaverse system comprising:
a client computer coupled to a network, the client computer to send a request to open a recorded event environment of a metaverse application;
a time travel engine coupled to the network, the time travel engine to serve the recorded event environment to the client computer in response to the request to open the recorded event environment, wherein the time travel engine is configured to facilitate an interaction between the avatar of the user and the avatar of another user, wherein the other avatar of the other user is also appended within the playback of the recorded event environment; and
a display device coupled to the client computer, the display device to display the recorded event environment within a metaverse client viewer, wherein an avatar of a user of the client computer is appended within the playback of the recorded event environment.

15. The metaverse system of claim 14, wherein the time travel engine is further configured to allow the user to observe metadata of a virtual object in the recorded event environment.

16. The metaverse system of claim 14, further comprising a time travel interface coupled to the client computer, the time travel interface to allow a user to control at least one of a plurality of playback functions of the recorded event environment, wherein the plurality of playback functions comprises a play function, a rewind function, a fast forward function, and a stop function.

* * * * *